US012689260B2

(12) United States Patent
Umlandt

(10) Patent No.: US 12,689,260 B2
(45) Date of Patent: Jul. 21, 2026

(54) AXIALLY SECURING A SHAFT COMPONENT OF AN ELECTRIC MACHINE

(71) Applicant: Schaeffler Technologies AG & Co. KG, Herzogenaurach (DE)

(72) Inventor: Julian Umlandt, Bischweier (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 197 days.

(21) Appl. No.: 18/039,354

(22) PCT Filed: Dec. 3, 2021

(86) PCT No.: PCT/DE2021/100966
§ 371 (c)(1),
(2) Date: May 30, 2023

(87) PCT Pub. No.: WO2022/122077
PCT Pub. Date: Jun. 16, 2022

(65) Prior Publication Data
US 2023/0421021 A1 Dec. 28, 2023

(30) Foreign Application Priority Data
Dec. 7, 2020 (DE) .......................... 102020132468.5

(51) Int. Cl.
*H02K 7/00* (2006.01)
*H02K 1/28* (2006.01)

(52) U.S. Cl.
CPC .............. *H02K 7/003* (2013.01); *H02K 1/28* (2013.01)

(58) Field of Classification Search
CPC ........ H02K 1/28; H02K 7/003; B21D 39/048; F16L 3/00
See application file for complete search history.

(56) References Cited

U.S. PATENT DOCUMENTS

| | | | |
|---|---|---|---|
| 5,831,368 A | 11/1998 | Hatsios et al. | |
| 5,928,099 A * | 7/1999 | Tsunemi | B60K 7/0015 |
| | | | 180/9.62 |

(Continued)

FOREIGN PATENT DOCUMENTS

| | | |
|---|---|---|
| CN | 101435453 A | 5/2009 |
| CN | 105391211 A | 3/2016 |

(Continued)

OTHER PUBLICATIONS

Labisch, S., Weber, C.: Technical drawing. Learn independently and effectively Above. 4th Edition. Wiesbaden: Springer Vieweg, pp. 211-215, 2013.

*Primary Examiner* — Christopher M Koehler
*Assistant Examiner* — Ethan Nguyen Vo
(74) *Attorney, Agent, or Firm* — Volpe Koenig

(57) ABSTRACT

A shaft system includes a shaft having a first shaft portion. The first shaft portion has a profile which is formed in the radial direction, extends in the axial direction, has a constant cross-section in a first region, and is open in the axial direction towards a first side of the shaft portion. In a second region of the first shaft portion adjoining the first region, the profile has a taper in the direction of a second side opposite the first side. A peripheral groove extending in the circumferential direction is introduced between the first region and the second region and forms a first groove flank in the first region and a second groove flank in the second region. The second groove flank forms an axial boundary for the profile in the first region towards the second side. Also disclosed is an electric machine comprising said shaft system.

19 Claims, 4 Drawing Sheets

(56)     References Cited

U.S. PATENT DOCUMENTS

| 2005/0119077 | A1 | | 6/2005 | Faucon et al. |
| 2010/0013351 | A1 | | 1/2010 | Gas et al. |
| 2011/0221296 | A1 | | 9/2011 | Vedy |
| 2012/0248920 | A1 | | 10/2012 | Takahashi et al. |
| 2014/0364263 | A1 | * | 12/2014 | Tokunaga ............ F16C 35/063 |
| | | | | 310/90 |
| 2015/0125269 | A1 | | 5/2015 | Bois et al. |
| 2018/0135703 | A1 | | 5/2018 | Ponikiewski et al. |
| 2021/0347247 | A1 | * | 11/2021 | Ehn ........................ H02K 5/203 |
| 2021/0408854 | A1 | * | 12/2021 | Wang ...................... H02K 1/28 |

FOREIGN PATENT DOCUMENTS

| DE | 2062419 | | 6/1972 | |
| DE | 102005046285 | | 8/2006 | |
| DE | 102015014535 | | 7/2016 | |
| DE | 102017011412 | | 6/2018 | |
| EP | 1530278 | | 5/2005 | |
| EP | 2560268 | | 2/2013 | |
| EP | 2154767 | | 3/2017 | |
| JP | S6096164 | | 5/1985 | |
| JP | H0366518 | A | 3/1991 | |
| JP | 2014064409 | | 4/2014 | |
| JP | 2016201896 | | 12/2016 | |
| JP | 6870565 | B2 * | 5/2021 | ............... H02K 1/22 |

* cited by examiner

AXIALLY SECURING A SHAFT COMPONENT OF AN ELECTRIC MACHINE

CROSS-REFERENCE TO RELATED APPLICATIONS

This application is the U.S. National Phase of PCT Appln. No. PCT/DE2021/100966, filed Dec. 3, 2021, which claims priority from German Patent Application No. 10 2020 132 468.5, filed Dec. 7, 2020, the entire disclosures of which are incorporated by reference herein.

TECHNICAL FIELD

The present disclosure relates to a shaft system of an electric machine and an electric machine.

BACKGROUND

In shaft systems, depending on the function to be performed, the axial securing of shaft components on the shaft can be required. This can be achieved in the axial direction via corresponding stops.

In particular with reference to electric machines, the prior art generally provides for an axial stop in a shaft system to be implemented via a shaft shoulder or a shaft flange. If shaft components have to be pushed onto a portion of the shaft up to such an axial stop, the use of a shaft nut, for example, as a second axial stop is also known. In addition to providing for the axial securing, an axial preload force can also be applied via the shaft nut. Alternatively, so-called snap rings are known which are introduced into grooves and thus form an axial stop.

JP2016201896A describes a shaft system of an electric machine in which a rotor is mounted on a shaft, wherein the rotor has a shaft flange or shaft shoulder as an axial stop on one side. On the opposite side, a ring is mounted on the shaft as an axial stop. The assembly is carried out by means of a transverse press fit, which is implemented by the characteristic shape of the ring in combination with axial press-fitting.

EP2154767B1 describes a shaft system of an electric machine in which a rotor forms a shaft flange as an axial stop on one side. On the opposite side, an axial stop is implemented by caulking an annular element into a peripheral groove of the shaft by means of a multi-part tool.

In addition to axial securing, a further requirement can be rotational securing or the tangential bidirectional transmission of forces between the shaft and shaft components. According to the prior art, this can be achieved, for example, by means of transverse press fits, grooves, profiled shafts and splines.

DE2062419A1 shows a spline for rotationally securing laminated cores of a rotor. In JP60096164A2 as well as JP2014064409 A2, profiled shafts with corresponding counter-profiles in the shaft components are described.

The designs described above have in common that a significant cost factor in the manufacture of a shaft system is due to the implementation of the axial stops and the rotational securing. Either high manufacturing efforts are required or complex assembly devices have to be employed.

Another background shaft system is known from DE2062419A1.

SUMMARY

It is therefore the object of the present disclosure to implement a shaft system for an electric machine that is as simple and inexpensive as possible.

The object is achieved by using one or more of the measures described herein. Further advantageous embodiments are described below and in the claims.

According to one aspect, a shaft system comprises a shaft having a first shaft portion. The first shaft portion has a profile which is formed in the radial direction, extends in the axial direction and has a constant cross-section in a first region. The profile is open in the axial direction on a first side of the first shaft portion. Further, the profile has a taper in a second region of the first shaft portion adjoining the first region in the direction of a second side opposite the first side. A peripheral groove extending in the circumferential direction is introduced between the first region and the second region, forming a first groove flank in the first region and a second groove flank in the second region. The second groove flank represents an axial stop of the profile in the second region.

According to one embodiment, the taper has a reduction of the profile width in the circumferential direction as well as a reduction of the profile depth in the radial direction.

According to a further embodiment, the first shaft portion has a first tip diameter in the first region. Furthermore, the first shaft portion has a second tip diameter in the second region. The second tip diameter is larger than the first tip diameter.

This design makes it possible to increase the area of the second groove flank forming the axial stop. In other words: The combination of a narrower profile gap due to the taper and a larger tip circle on the second groove flank forms the axial stop.

According to a further embodiment, the profile in the first region is designed to receive a shaft component with a corresponding counter-profile. The second groove flank forms an axial stop for the shaft component.

The shaft component is radially centered on the shaft with the profile of the shaft via the corresponding counter-profile. A rotation lock is also implemented.

In particular, the profile in the first region and the corresponding counter-profile of the shaft component are designed to transmit forces in the circumferential direction.

Advantageously, the profile in the first region is a spline profile. The taper in the second region is implemented by the run-out of the tool used to produce the spline profile.

Shafts with a corresponding spline profile are also referred to as profiled shafts or spline shafts. The production of the spline can be carried out by means of a disk-shaped form cutter. In this context, the run-out is understood to mean the moving out of the form cutter on the second side. Alternative manufacturing processes include, for example, cold rolling, gear hobbing and grinding.

According to a further embodiment, the shaft component consists of several parts.

Advantageously, the shaft component is a rotor core of an electric machine. In this regard, the rotor core comprises a first balancing disk and a first laminated core. In particular, the rotor core can include further elements such as further rotor cores as well as a second balancing disk.

he balancing disk can advantageously be stamped from sheet metal. The interior of the balancing disk can be designed to be potted. This potting represents a spring element in the combination of components and can, in addition to component tolerances, also compensate for an increasing preload force that can result from different coefficients of thermal expansion of the individual components during operation.

According to a further embodiment, the shaft has a second shaft portion. This comprises a peripheral groove extending in the circumferential direction, a securing device and a form-fitting connection. The form-fitting connection is implemented by a deformation of the securing device into the groove. The securing device forms an axial first stop for the shaft component in the second shaft portion.

It is advantageous if the deformation is effected radially and partially, for example by means of metal stamping. A high number of deformations and an associated reduction in a force required for deformation is particularly advantageous, as an axial material expansion at the end faces of the securing device is minimized and evenly distributed, in particular if these are designed as sleeves. By minimizing this axial deformation, a second stop can be implemented in the second shaft portion in addition to the first stop, which can also be used as a stop surface for rotational bearings, in particular rolling bearings, for example.

According to a further aspect, an electric machine comprises a shaft system according to the aspect and embodiments described above.

BRIEF DESCRIPTION OF THE DRAWINGS

The disclosure is explained in more detail below using the exemplary embodiment shown in the figures. In the figures.

DETAILED DESCRIPTION

The following is a description of one embodiment according to the present disclosure.

Figures 1A, 1B:
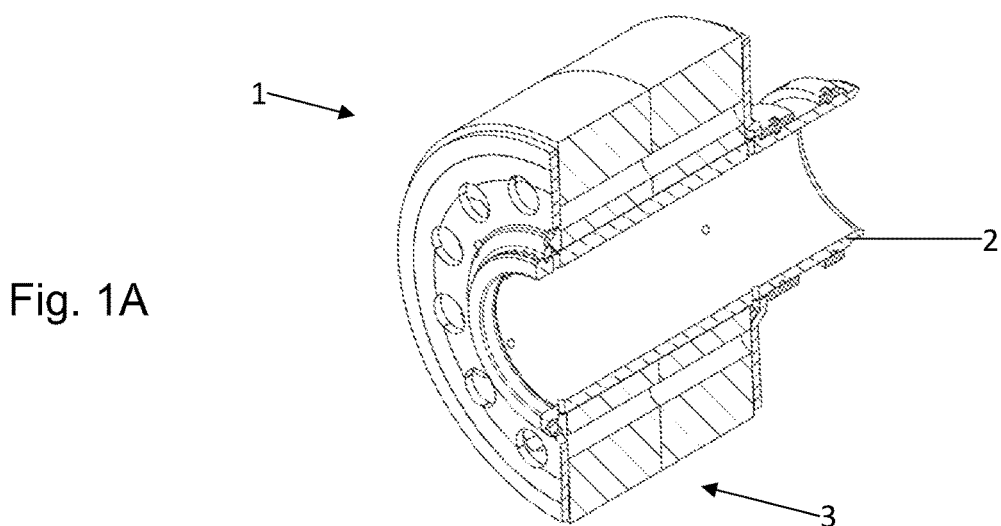
FIG. 1 shows a perspective sectional view and a projection of the sectional view of the shaft system.

FIG. 1 shows a perspective sectional view and a projection of the sectional view of the shaft system 1 from FIG. 1. The shaft system 1 comprises a shaft 2, which has a first shaft portion 2.1 and a second shaft portion 2.2.

In the first portion, a shaft component 3 is applied to the shaft 2. The shaft component 3 comprises a first balancing disk 3.1, a second balancing disk 3.2, a first laminated core 3.3 and a second laminated core 3.4. The balancing disks 3.1, 3.2 are designed to be potted so that coolant from a cooling system 4 can be fed via cooling channels 4.1 and associated bores 4.2 from the shaft 1 in the direction of the laminated cores 3.3, 3.4. A further advantage of the potted design can be seen in a spring effect of the balancing disks 3.1, 3.2, whereby a defined axial preload force can be applied due to a characteristic spring curve in combination with the axial position of the second balancing disk 3.2 and tolerances due to thermal expansion can be compensated for.

The first shaft portion 2.1 has a profile 2.1.4 which is formed in the radial direction, extends in the axial direction, has a constant cross-section in a first region 2.1.1, and is open on one side of the shaft portion in the axial direction towards the second shaft portion 2.2.

The shaft component 3 is pushed onto the first shaft portion from the direction of the second shaft portion 2.2 and is secured against rotation by means of a counter-profile corresponding to the constant cross-section of the first region 2.1.1 and is designed to transmit forces bidirectionally in the circumferential direction from the shaft component 3 to the shaft 2.

Figure 3:
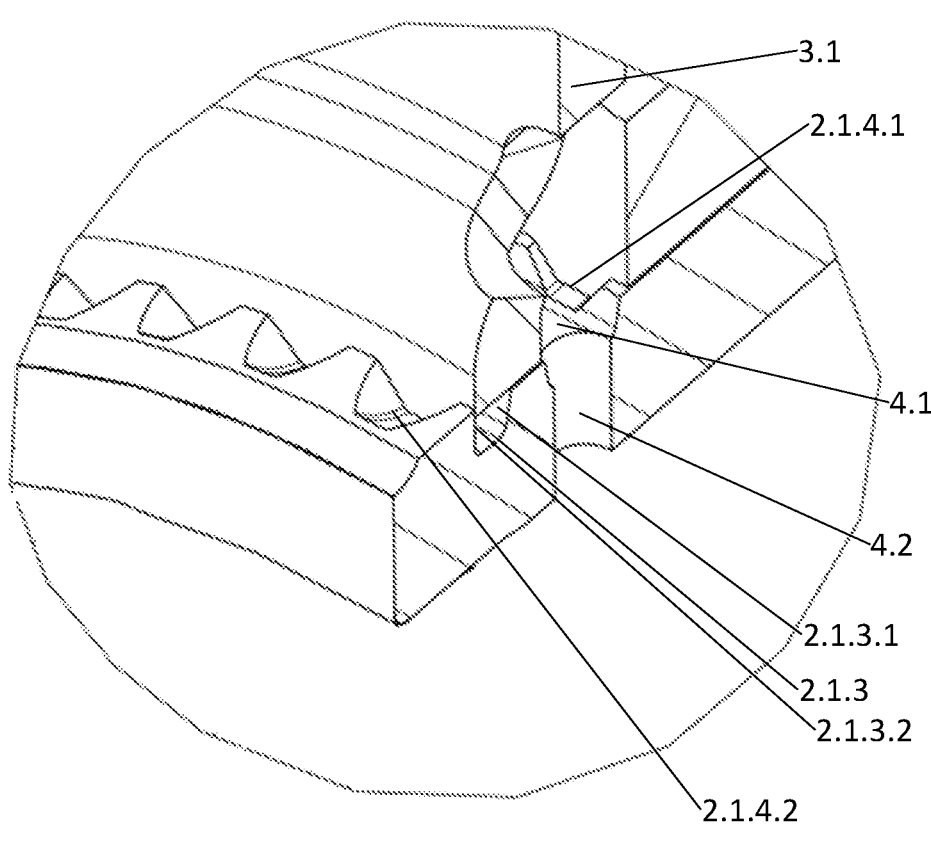
FIG. 3 shows a perspective sectional view of a detail of the shaft system, from Figure.

The first region 2.1.1 is adjoined by a second region 2.1.2 in which the profile 2.1.4 has a taper 2.1.4.2, which is illustrated in FIG. 3.

A peripheral groove 2.1.3 extending in the circumferential direction is introduced between the first region 2.1.1 and the second region 2.1.2, which forms a first groove flank 2.1.3.1 in the first region 2.1.1 and a second groove flank 2.1.3.2 in the second region 2.1.2. Due to the taper 2.1.4.2 (see FIG. 3), the second groove flank 2.1.3.2 forms an axial stop of the profile 2.1.4 in the second region 2.1.2, or represents an axial stop for the corresponding counter-profile of the shaft component 3 respectively. In the present embodiment, this is implemented by the first balancing disk 3.1 interacting with the second groove flank 2.1.3.2.

On the side opposite the first balancing disk 3.1, the second balancing disk 3.2 is in contact with a securing device 2.2.1. The securing device 2.2.1 thus represents a stop in the second shaft portion 2.2 in the axial direction for the shaft component 3.

In the region of the second shaft portion 2.2, the shaft 2 has a peripheral groove 2.2.3. The securing device 2.2.1 forms a form-fitting connection 2.2.2 with the groove 2.2.3 by deformation 2.3 (see FIG. 3) of the securing device 2.2.1 into the groove 2.2.3.

The securing device 2.2.1 is designed as a sleeve made of a tubular material. The material thickness can be regarded as constant in the circumferential direction as well as in the axial direction, so that a constant wall thickness can be assumed. In this regard, the axial extension of the sleeve is selected in such a way that manufacturing tolerances, for example of the shaft 2 and the shaft component 3, are compensated for and thus the securing device 2.2.1 is arranged above the groove 2.2.3 in such a way that the form-fitting connection 2.2.2 is implemented in a reliable manner.

The securing device 2.2.1 has a first axial stop 2.2.4.1 for the shaft component 3, in the specific embodiment for the second balancing disk 3.2, as well as a second axial stop 2.2.4.2, which is arranged on the side of the securing device 2.2.1 opposite the first axial stop 2.2.4.1. The second axial stop 2.2.4.2 serves as a stop for a further shaft component (not shown).

If the further shaft component is to be axially secured, a first groove 2.2.3.1 and a second groove 2.2.3.2 are introduced into the shaft 2 in the second shaft portion 2.2. Furthermore, the second shaft portion 2.2 has a first securing device 2.2.1.1 and a second securing device 2.2.1.2. In this regard, the first securing device 2.2.1.1 forms the first form-fitting connection 2.2.2.1 with the first groove 2.2.3.1 at a first location on the shaft 2. The second securing device 2.2.1.2 forms the second form-fitting connection 2.2.2.2 with the second groove 2.2.3.2 at a second location of the shaft. The further shaft component is then arranged between the securing devices 2.2.1.1, 2.2.1.2. In a variant of the embodiment, this can be, for example, a bearing element or a rotational position sensor.

Both securing devices 2.2.1.1, 2.2.1.2 each have a first stop 2.2.4.1 and a second stop 2.2.4.2.

Figure 2:
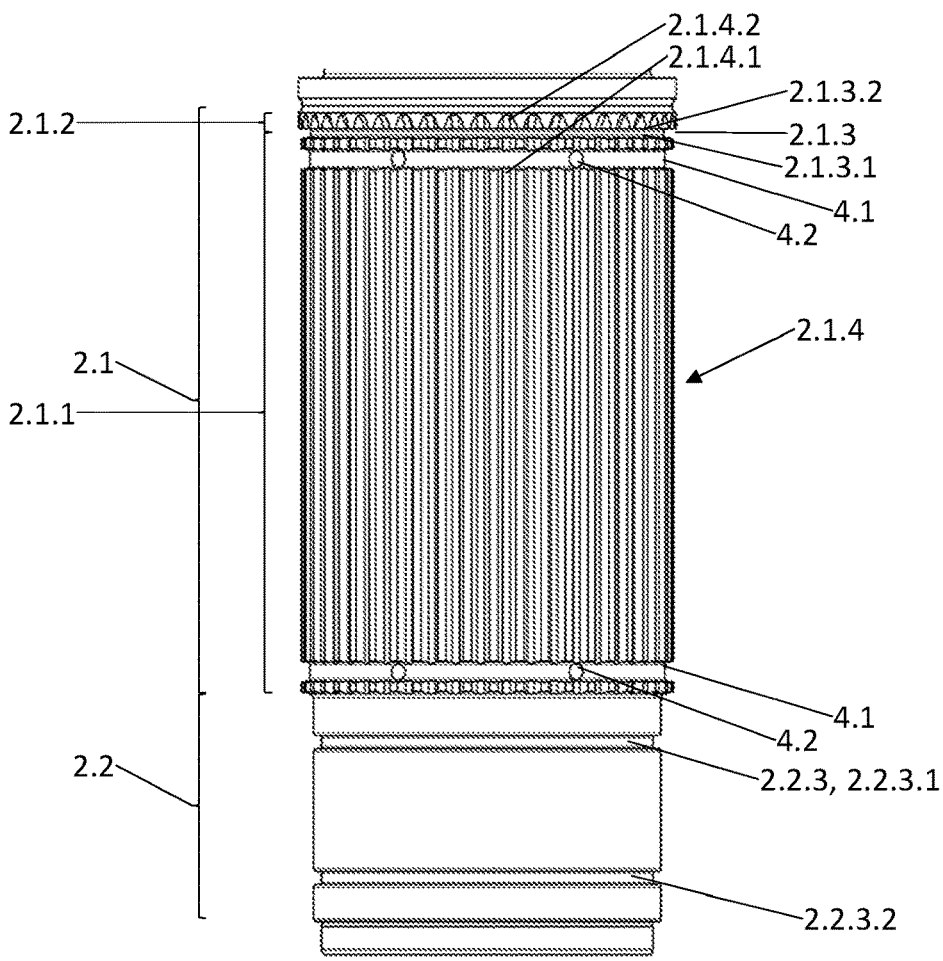
FIG. 2 shows a top view of the shaft of the shaft system from FIG. 1.

FIG. 2 shows a top view of the shaft 2 of the shaft system 1 from FIG. 1.

The shaft 2 comprises two shaft portions 2.1 and 2.2. In the first shaft portion 2.1, the profile 2.1.4, which is pronounced in the axial direction, can be seen. The profile 2.1.4 is interrupted by radially circumferential cooling channels 4.1 of the cooling system 4, which allow coolant to flow via bores 4.2.

In the second shaft portion 2.2, which directly adjoins the first shaft portion 2.1, the first groove 2.2.3.1 and the second groove 2.2.3.2 can be seen.

In the second region 2.1.2 of the first shaft portion 2.1, the taper 2.1.4.2 of the profile 2.1.4 can be seen, located above the groove 2.1.3 in the top view. The taper 2.1.4.2 is created due to the manufacturing process of the profile tracks 2.1.4.1, for example, when a profile cutter is moved out. In particular, the taper 2.1.4.2 is designed as a reduction of the profile width in the circumferential direction as well as a reduction of the profile depth in the radial direction.

Furthermore, the first region 2.1.1 has a first tip diameter of the shaft 2 and the second region 2.1.2 has a second tip diameter of the shaft 2, wherein the second tip diameter is larger than the first tip diameter.

The groove 2.1.3 forms a first groove flank 2.1.3.1 in the first region 2.1.1 and a second groove flank 2.1.3.2 in the second region 2.1.2. Due to the taper 2.1.4.2, the second groove flank 2.1.3.2 forms an axial boundary of the profile 2.1.4 in the second region 2.1.2, or represents an axial stop for the corresponding counter-profile of the shaft component 3 respectively. The larger tip diameter in the second region 2.1.2 additionally increases the area of the axial stop.

FIG. 3 shows a perspective sectional view of a detail of the shaft system from FIG. 1 to illustrate the assembly situation.

Figure 4:
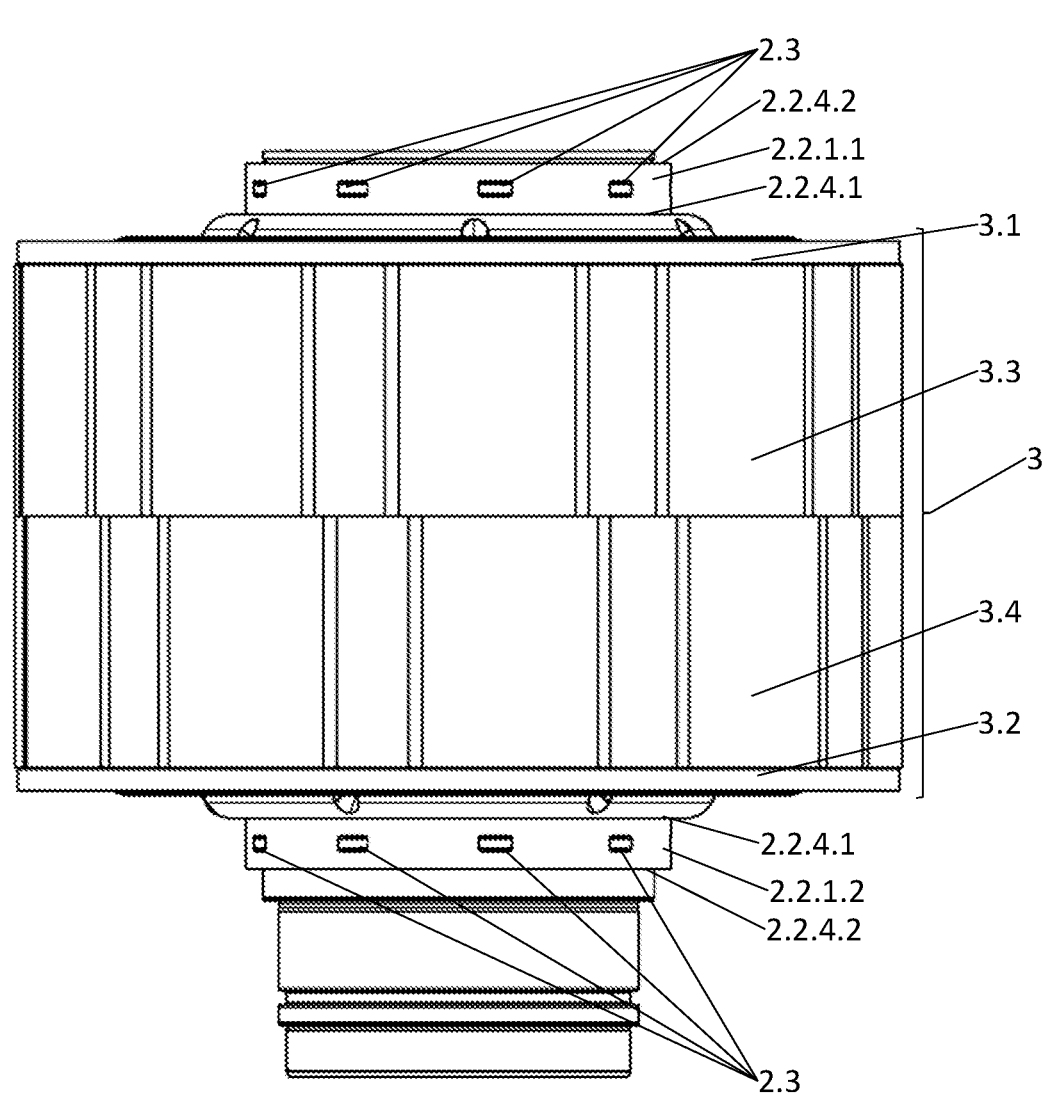
FIG. 4 shows a top view of a variant of the shaft system according to FIG. 1.

FIG. 4 shows a top view of a variant of the shaft system 1 according to FIG. 1 and FIG. 2. For axially securing the shaft component 3, a first securing device 2.2.1.1 and a second securing device 2.2.1.2 are provided in the variant. Here, the first balancing disk 3.1 is in contact with a first stop 2.2.4.1 of the first securing device 2.2.1.1. The first securing device 2.2.1.1 forms a first form-fitting connection 2.2.2.1 with a first groove 2.2.3.1 of the shaft 2. The first form-fitting connection 2.2.2.1 is therein implemented via several radial deformations 2.3 of the first securing device 2.2.1.1 into the first groove 2.2.3.1.

The second balancing disk 3.2 is in contact with a first stop 2.2.4.1 of the second securing device 2.2.1.2. The second securing device 2.2.1.2 forms a second form-fitting connection 2.2.2.2 with a second groove 2.2.3.2 of the shaft 2. The second form-fitting connection 2.2.2.2 is implemented in this case by several radial deformations 2.3 of the second securing device 2.2.1.2 into the second groove 2.2.3.2.

Both securing devices 2.2.1.1, 2.2.1.2 have a first stop 2.2.4.1 and a second stop 2.2.4.2.

The securing devices 2.2.1.1, 2.2.1.2 are each designed as a sleeve made of a tubular material. The material thickness can be regarded as constant in the circumferential direction as well as in the axial direction, so that a constant wall thickness can be assumed.

In the production of the illustrated variant of the shaft system 1, the first securing device 2.2.1.1 is pushed on until a predetermined position is reached. In this case, the first securing device 2.2.1.1 is arranged above the first groove 2.2.3.1 in such a way that a first form-fitting connection 2.2.2.1 is formed by means of a deformation 2.3 of the securing device 2.2.1.1 into the first groove 2.2.3.1. The shaft component 3 is then pushed onto the shaft 2. The second securing device 2.2.1.2 is then pushed on to a predetermined position or until a predetermined axial pre-load force is reached, so that the second securing device 2.2.1.2 is arranged over the second groove 2.2.3.2 in such a way that a second form-fitting connection 2.2.2.2 is formed by means of a deformation 2.3 of the securing device 2.2.1.2 into the second groove 2.2.3.2.

LIST OF REFERENCE SIGNS

1 Shaft system
2 Shaft
2.1 First shaft portion
2.1.1 First region
2.1.2 Second region
2.1.3 Groove
2.1.3.1 First groove flank
2.1.3.2 Second groove flank
2.1.4 Profile
2.1.4.1 Profile track
2.1.4.2 Taper
2.2 Second shaft portion
2.2.1 Securing device
2.2.1.1 First securing device
2.2.1.2 Second securing device
2.2.2 Form-fitting connection
2.2.2.1 First form-fitting connection
2.2.2.2 Second form-fitting connection
2.2.3 Groove
2.2.3.1 First groove
2.2.3.2 Second groove
2.2.4.1 First stop
2.2.4.2 Second stop
2.3 Deformation
3 Shaft component
3.1 First balancing disk
3.2 Second balancing disk
3.3 First laminated core
3.4 Second laminated core
4 Cooling system
4.1 Cooling channel
4.2 Bore

The invention claimed is:

1. A shaft system, comprising:
a shaft with a first shaft portion that has a profile which is formed in a radial direction, extends in an axial direction, has a constant cross-section in a first region, and is open in the axial direction towards a first side of the first shaft portion;
in a second region of the first shaft portion adjoining the first region, the profile has a taper in a direction of a second side opposite the first side, wherein the taper has a reduction of a profile width in the circumferential direction as well as a reduction of a profile depth in the radial direction;
a peripheral groove extending in a circumferential direction between the first region and the second region that forms a first groove flank in the first region and a second groove flank in the second region; and
the second groove flank abuts or adjoins the taper, forming an axial stop of the profile in the second region towards the second side.

2. The shaft system according to claim 1, wherein the first shaft portion has a first tip diameter in the first region, the first shaft portion has a second tip diameter in the second region, and the second tip diameter is larger than the first tip diameter.

3. The shaft system according to claim 1, wherein the profile in the first region is adapted to receive a shaft component with a corresponding counter-profile, and the second groove flank forms the axial stop for the shaft component.

4. The shaft system according to claim 3, wherein the profile in the first region and the corresponding counter-profile of the shaft component are configured to transmit forces in the circumferential direction.

5. The shaft system according to claim 1, wherein the profile in the first region is a spline profile, and the taper in the second region is implemented by a run-out of a tool used to produce the spline profile.

6. The shaft system according to claim 3, wherein the shaft component is formed of several parts.

7. The shaft system according to claim 6, wherein the shaft component is a rotor core of an electric machine comprising a first balancing disk and a first laminated core.

8. The shaft system according to claim 3, further comprising:

a second shaft portion with a second peripheral groove extending in the circumferential direction;

a securing device;

a form-fitting connection formed by a deformation of the securing device into the second peripheral groove; and the securing device forms an axial first stop in the second shaft portion for the shaft component.

9. An electric machine comprising a shaft system according to claim 1.

10. A shaft system, comprising:

a shaft that is hollow from a first axial end to a second axial end, the shaft comprising a first shaft portion that has a profile which is formed in a radial direction, extends in an axial direction, has a constant cross-section in a first region, and is open in the axial direction towards a first side of the first shaft portion;

in a second region of the first shaft portion adjoining the first region, the profile has a taper in a direction of a second side located opposite to the first side;

a peripheral groove extending in a circumferential direction between the first region and the second region that forms a first groove flank in the first region and a second groove flank in the second region;

the second groove flank abuts or adjoins the taper, forming an axial stop of the profile in the second region towards the second side; and a circumferentially extending cooling channel located in the first region, the cooling channel being fluidly connected to the hollow interior of the shaft through at least one bore.

11. The shaft system according to claim 10, wherein the taper has a reduction of a profile width in the circumferential direction as well as a reduction of a profile depth in the radial direction.

12. The shaft system according to claim 10, wherein the first shaft portion has a first tip diameter in the first region, the first shaft portion has a second tip diameter in the second region, and the second tip diameter is larger than the first tip diameter.

13. The shaft system according to claim 10, wherein the profile in the first region is adapted to receive a shaft component with a corresponding counter-profile, the second groove flank forms the axial stop for the shaft component; and the cooling channel is adapted to provide cooling fluid to the shaft component.

14. The shaft system according to claim 13, wherein the profile in the first region and the corresponding counter-profile of the shaft component are configured to transmit forces in the circumferential direction.

15. The shaft system according to claim 10, wherein the profile in the first region is a spline profile, and the taper in the second region comprises a radial run-out of the spline profile.

16. The shaft system according to claim 13, wherein the shaft component is formed of several parts.

17. The shaft system according to claim 16, wherein the shaft component is a rotor core of an electric machine comprising a first balancing disk and a first laminated core, and the cooling channel is configured to provide a flow of cooling fluid to the laminated core.

18. The shaft system according to claim 13, further comprising: a second shaft portion with a second peripheral groove extending in the circumferential direction; a securing device; a form-fitting connection formed by a deformation of the securing device into the second peripheral groove; and the securing device forms an axial first stop in the second shaft portion for the shaft component.

19. The shaft system according to claim 18, wherein there are two of the circumferentially extending cooling channels located in the first region, a first one of the circumferentially extending cooling channels being located adjacent to the peripheral groove that extends in the circumferential direction between the first region and the second region, and the second one of the circumferentially extending cooling channels being located adjacent to the second peripheral groove.

* * * * *